United States Patent [19]
Coya

[11] Patent Number: 5,078,434
[45] Date of Patent: Jan. 7, 1992

[54] CONNECTOR, IN PARTICULAR FOR HIGH PRESSURE HYDRAULIC CIRCUIT

[75] Inventor: Raymond Coya, Lyon, France

[73] Assignee: Societe des Flexibles Anoflex S.A., Caluire et Cuire, France

[21] Appl. No.: 429,466

[22] Filed: Oct. 16, 1989

[30] Foreign Application Priority Data

Oct. 14, 1988 [FR] France .................... 88 13721

[51] Int. Cl.⁵ .................................... F16L 37/08
[52] U.S. Cl. ............................ 285/325; 285/315
[58] Field of Search .......... 285/39, 325, 314, 308, 285/325, 319, 313, 315, 327, 321

[56] References Cited

U.S. PATENT DOCUMENTS

| | | | |
|---|---|---|---|
| 2,468,847 | 5/1949 | Trainor | 285/315 |
| 2,939,729 | 6/1960 | O'Shaughnessy | 285/315 |
| 2,952,482 | 9/1960 | Torres | 285/313 |
| 3,653,689 | 4/1972 | Sapy et al. | 285/308 |
| 3,826,523 | 7/1974 | Eschbaugh | 285/39 |
| 3,997,196 | 12/1976 | Karcher et al. | |
| 4,036,515 | 7/1977 | Karcher et al. | 285/315 |
| 4,135,745 | 1/1979 | Dehar | |
| 4,681,350 | 7/1987 | Gaita | 285/315 |
| 4,691,943 | 9/1987 | DeLand et al. | 285/315 |

FOREIGN PATENT DOCUMENTS 219705 4/1987 European Pat. Off. ............ 285/315

*Primary Examiner*—Eric K. Nicholson
*Attorney, Agent, or Firm*—Sandler, Greenblum & Bernstein

[57] ABSTRACT

A connector for a conduit such as a hose or a rigid pipe forming part of a high pressure hydraulic circuit having. A female part is provided in which is inserted the free end of the pipe having a peripheral rim or flange to be connected and a male part which cooperates with the female part in order to immobilize the free end of the pipe in the female part. The female part of the connector also has a body which locates the free end of the pipe being connected. The male part is provided with a clip-in locking device which includes retractable members located between a shoulder formed in the body and the rear face of the peripheral rim or flange formed in the pipe, and oriented towards the opening the latter component and designed to prevent the pipe from being released from the female part.

23 Claims, 2 Drawing Sheets

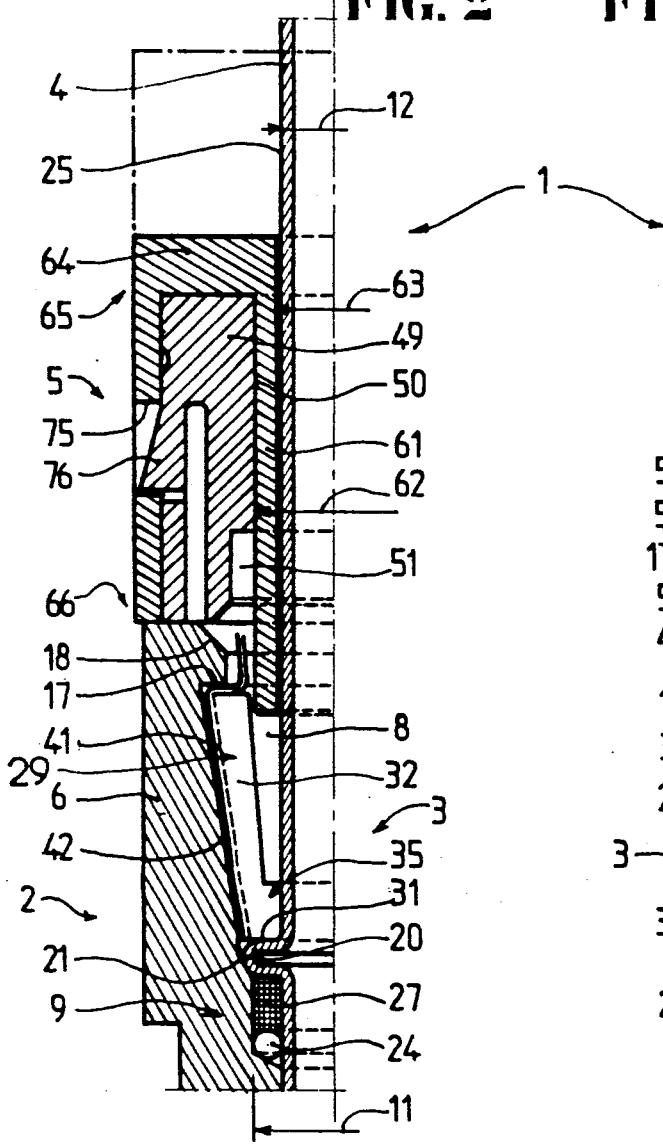
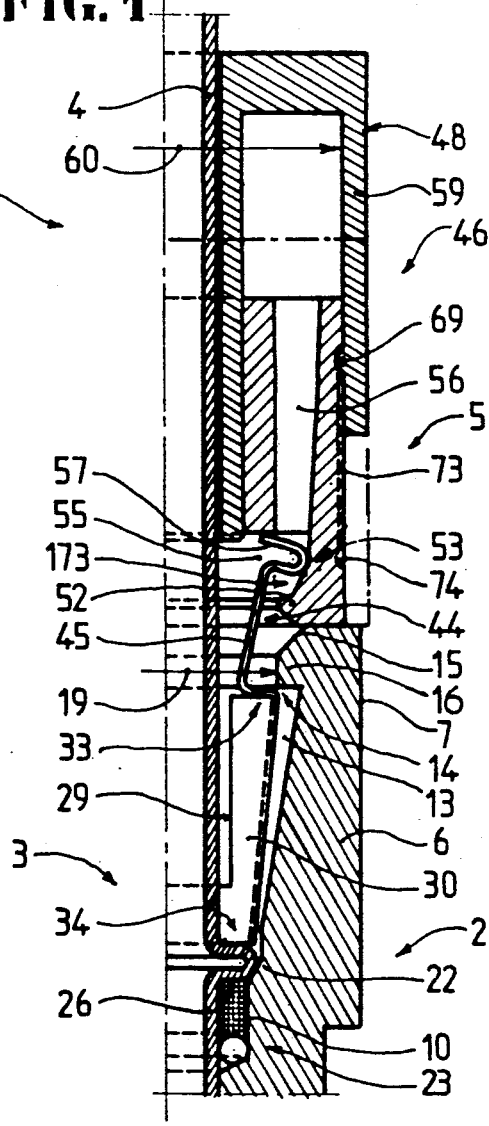
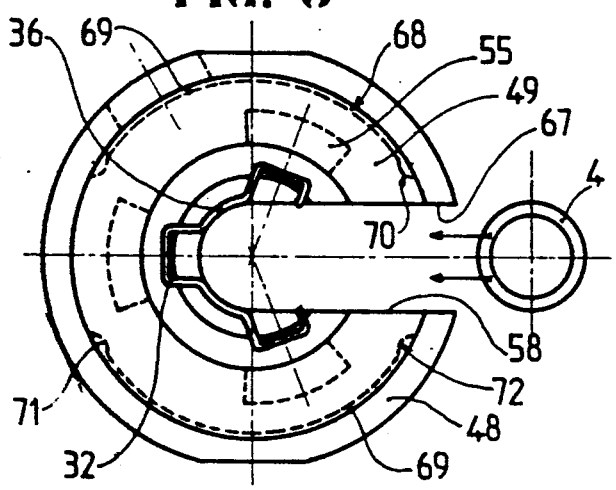
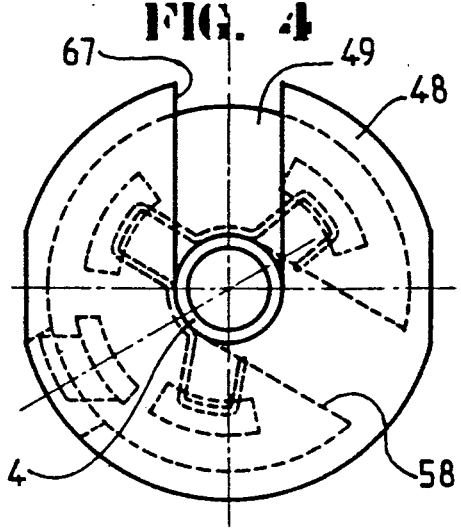

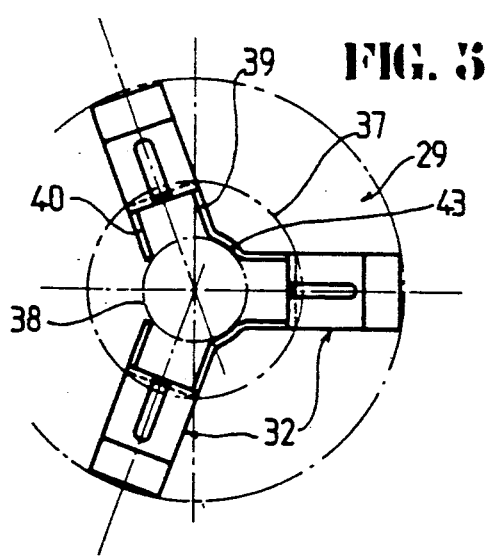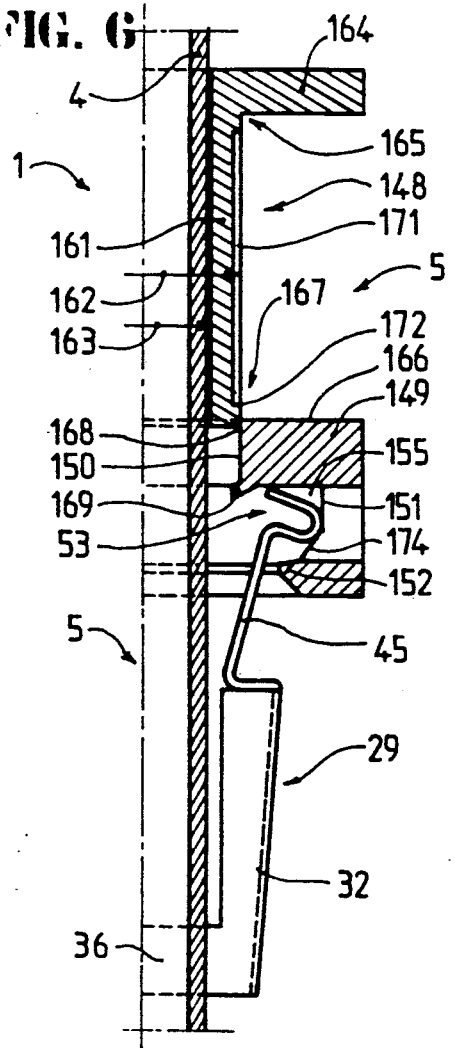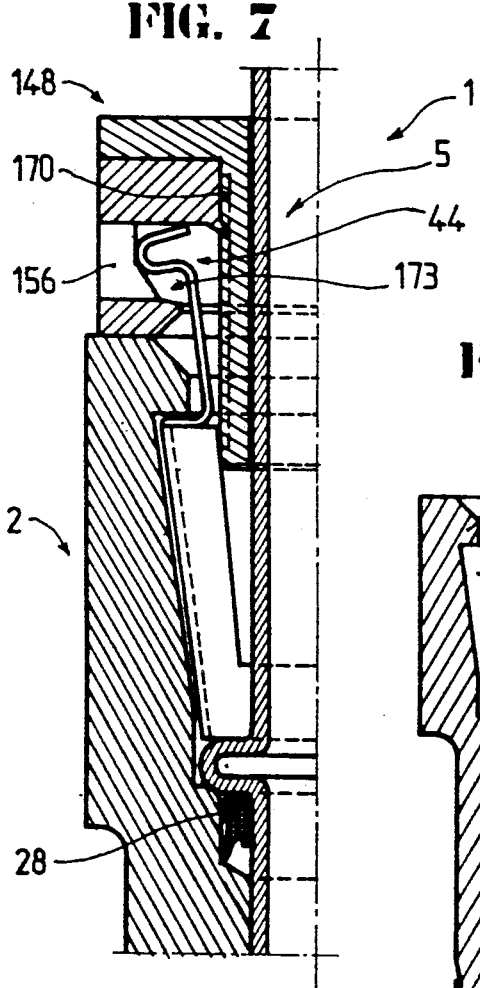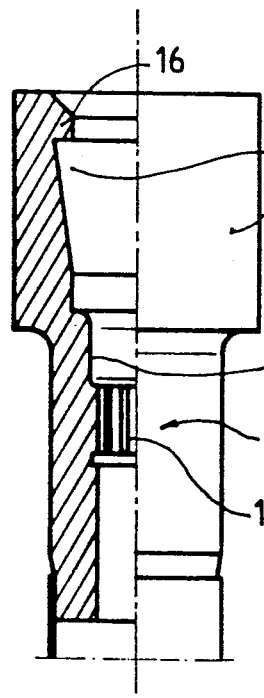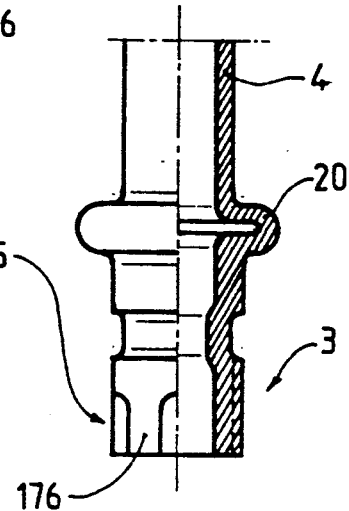

CONNECTOR, IN PARTICULAR FOR HIGH PRESSURE HYDRAULIC CIRCUIT

BACKGROUND OF THE INVENTION

1. Field of the Invention

The invention concerns a connector for a hose or a rigid pipe, in particular, for use in a high pressure hydraulic circuit, comprising, on the one hand, a female part in which the free end of a pipe to be connected is inserted, a female part being formed by a body which includes, from the base, a cylindrical bore with a diameter at least equal to the external diameter of the pipe to be connected, a housing and a restriction defining, together with the latter, a shoulder and, on the other hand, clip-in-type locking devices comprising retractable stops positioned between the shoulder formed in the body and, on the rear face, a peripheral flange or rim formed on the pipe to be connected, this preventing its release from the female part.

This invention is applicable to any installation through which a fluid is conveyed and which may or may not be subject to high pressures and, more particularly, in those industries specializing in the application of hydraulics.

2. Description of Background and Relevant Information

Those types of connectors most frequently used provide a connection between pipes through which a fluid is conveyed, in particular, under high pressure, comprising, on the one hand, a female part which includes a threaded bore into which the free end of the pipe to be connected is inserted. On the other hand, the connector comprises a male part which is in the form of a sleeve or bush fixed over the pipe and including, over its external circumference, a threaded section which is designed to co-operate with the thread provided in the bore of the female part.

More precisely, this male part engages the pipe at the rear of a peripheral rim or flange so that, after being screwed in and tightened into the female part, the pipe is immobilize in this latter part by the resulting action on the rear face of the said peripheral rim or flange.

The design of these connecters for pipes subject to high pressures is in no way suitable for existing assembly methods. In large scale manufacturing, such as, the automobile industry, use is being increasingly made of robots in order to assemble the various parts comprising these components.

This is particularly so in the case of fitting and assembling sheet metal parts, the engine, the instrument panel and certain electrical wiring installations with their connection to the various different control units or other items.

However, this method of assembly using robots requires compliance with certain conditions. In particular, the connection of parts to be assembled must be easily carried out without the need for any specific dexterition. Also, it is necessary to take into consideration that the gripping devices fitted to automatic machines, that is, robots, are only suitable for carrying out very simple movements of limited scope.

Also, if these gripping devices are capable of displacement, without too much difficulty, by translation, in order to move from one point to another, the amount of angular displacement which it is possible to impart is still, however, limited. Therefore, use is very frequently made of pneumatic methods to provide a constant rotational movement, this corresponding, for example, to a screwing down action.

Another point which should be taken into consideration is that the various different parts are generally held by a simple tightening action provided by suitably shaped clamping or gripping devices.

Also, the part to be assembled must be easily accessible because of the overall dimensions generally possessed by these gripping devices fitted to robots.

Further to the above explanation, it will be easily understood that those connectors where the male part is introduced into the female part by means of a screw down action are, at present, assembled manually as no suitable automatic technique has been determined.

Another disadvantage concerning a screw type assembly is due to the amount of tightening required for the male part in the female part. The level or amount of thightening action effected is random in nature as it is difficult to reproduce. However, the performance of a connector, regarding time and the pressure involved, will depend on this tightening torque applied to the male part.

Also, other types of connections are available, these being known as rapid action types, the basic characteristic consisting in that the male part assembled onto the pipe to be connected is rendered integral with the female part following a simple axial pressure.

More precisely, the male part is in the form of a tubular end piece which includes, on its external circumference, a groove into which a number of balls are introduced, after engaging the female part, these balls being positioned in a slot provided in the bore of the latter part. These balls are then immobilized radially by means of a sleeve which moves axially over the female part.

More precisely, these connectors constitute components forming a connection between two pipes originating from separate items of equipment. Therefore, it is necessary to use connectors such as those described above in order to provide a connection between these pipes and the said items of equipment. Also, these connectors are particularly expensive because of their difficult and complex design.

In accordance with document U.S. Pat. No. 3,826,523 another type of rapid action connector is known, this being used for a hydraulic circuit conveying a fluid under pressure. More precisely, this connector comprises a female part in the form of a body into which the free end of the pipe to be connected is inserted.

This includes, at this free end, a peripheral rim or flange which enables it to be immobilized in the female part by means of the male component. This latter is, more particularly, in the form of a clip-in ring threaded over the pipe to be connected, at the rear of the peripheral rim or flange.

This clip-in ring co-operates with the rear face of this latter part and, simultaneously, with a shoulder provided in the housing or location formed by the body, this constituting the female part, in order to prevent any movement by translation of the said pipe being connected in this latter part.

Also, in accordance with the method of construction described in this prior document, this female part or the body, when considered from the base of this latter part, comprises a bore with a diameter suitable for the pipe being connected, this bore emerging in a first shoulder recess in which the seal is located. This co-operates with the front face of the peripheral rim or flange corresponding to the pipe to be connected. This peripheral rim or flange is located in a housing with a slightly increased diameter in order that the part may be engaged and removed. It should be noted that this housing and, in particular, the rear face of the said peripheral rim or flange, includes a machined slot which defines the shoulder against which the locking devices for the clip-in ring comprising the male component are in contact.

According to a first method of construction, these locking devices are in the form of locking tongues cut in the wall of the said clip-in ring in order that they constitute stops which, when the connector is assembled, co-operate with the shoulder provided for that purpose in the body of the female part.

In accordance with a second method of construction, this clip-in ring is in the form of several tongues arranged co-axially to the pipe to be connected and, at their upper or lower end, are rendered integral by means of an annular part. Also, on their external face, these tongues include a stop which may be introduced into the slot provided for that purpose in the body housing constituting the female part so that it opposes any retraction of the pipe being connected from this latter component.

In any case, it is advantageous to consider that the connector described in this prior document is only applicable to low pressure hydraulic circuits, on the one hand, because of the relative strength and resistance of the locking devices comprising the male component and, on the other hand, the lack of suitable retaining devices.

The locking tongues forming part of the clip-in ring constituting the male component of this rapid type connecter are capable of flexing under the effects of pressure and this may result in the destruction of the connection provided by this type of connector.

Also, as this known rapid type connector is not provided with any means of locking which not only may prevent any accidental release of the male part from the female part but also may be used to ensure correct assembly of these latter components, this known rapid action connector cannot be adapted for any automatic method for its assembly and connection.

SUMMARY OF THE INVENTION

An object of this invention is to resolve all the disadvantages described by proposing a connector for pipes subject to high pressures which has a particularly safe and secure clip-in action and with a reduced manufacturing cost.

The invention, as described in the claims, resolves the problem of producing a connector suitable for a hose or a rigid pipe, in particular, for use with a high pressure hydraulic circuit and comprising, on the one hand a female part into which the free end of the pipe to be connected is inserted, this female part being formed by a body which, when considered from the base, is in the form of a cylindrical bore with a diameter at least equal to the external diameter of the pipe being connected, a housing and a restriction defining, together with this latter, a shoulder and, on the other hand, a clip-in locking device which includes rectractable stops located between the shoulder provided in the said body and the rear face of a peripheral rim or flange forming part of the pipe being connected, in order to prevent this from being released from the said female part. This connector is characterized by the fact that the said clip-in locking device or retractable stops are formed from at least two "U" shaped members and include a web which is capable of contacting the truncated wall of the housing, these members being arranged equally about the pipe being connected and, at their upper and lower end, respectively, co-operating with the shoulder of the body and the rear face of the peripheral rim or flange, the upper ends of the said members also being extended by gripping devices capable of co-operating with securing devices which prevent the said members from being displaced radially in the body and passing over the reduced section.

The advantages achieved as a result of this invention are basically due to the engagement of the male part in the female part requiring a simple axial push on either of these parts. The simplicity and security provided by this assembly enables the use of automated assembly methods for connecting the pipes, when the respective items of equipement are equipped with connectors in accordance with the invention.

This represents a definite advantage, in particular, as regards large scale production such as the automobile industry or similar.

BRIEF DESCRIPTION OF THE DRAWINGS

The invention will now be described in more detail by means of the FIGURES, representing methods of construction.

FIG. 1 represents one half of the connector in the form of a sectional view, in accordance with the invention, the clip-in locking devices being engaged in the female part but not secured in this latter component;

FIG. 2 represents a view similar to FIG. 1, the clip-in locking devices being, in this case, secured in the body constituting the female part;

FIG. 3 represents a schematic view and a sectional view of a connector, in accordance with the invention, constructed in accordance with a first method of construction and during its assembly to the pipe to be connected;

FIG. 4 represents a view from above and on completion of the assembly stage for the pipe in the connection illustrated in FIG. 3;

FIG. 5 is a view from above of the clip-in locking device;

FIG. 6 represents one half and a sectional view of the male part of a connection, in accordance with the invention, constructed in accordance with a second method of construction;

FIG. 7 represents one half and a sectional view of the connector illustrated in FIG. 6, the clip-in locking device being secured in the body constituting the female part;

FIG. 8 represents a partial cross section showing a particular method of constructing the end of the pipe being connected;

FIG. 9 represents the female part of a connector, capable of receiving the end of the pipe illustrated in FIG. 8.

DETAILED DESCRIPTION OF PREFERRED EMBODIMENTS

This invention relates to a connector 1 for a hose or a rigid pipe forming part of any hydraulic circuit and, in particular, a high pressure hydraulic circuit.

The connector, as described in this invention, comprises, on the one hand, a female part 2 associated with any item of equipment and into which is inserted the free end 3 of a pipe 4 to be connected. On the other hand, the connector includes a male part 5 designed to co-operate with the said female part 2 in order to immobilize this free end 3 of the said pipe 4 to be connected into this latter part.

In accordance with the invention, the female part 2 is, more precisely, in the form of a body 6 machined directly in the item of equipment to be connected or in a sleeve 7 which is rendered integral, by any known method, with the end of a hose or a rigid pipe.

This body 6 comprises a recess 8 designed to receive the free end 3 of the pipe being connected 4 and has various different diameters depending on the depth required. Also, the recess 8, when considered from the base 9 of the body 6, comprises a cylindrical bore 10 with a diameter 11 at least equal to the external diameter 12 of the pipe 4 to be connected and a housing 13, preferably truncated, the base 14 of the housing 13 being arranged in the direction of the orifice 15 of the body 6. Also, a restriction 16 enables a shoulder 17 to be defined in the area of this base 14 forming part of the truncated housing 13. Finally, a chamfer 18 provided at the orifice 15 enables the pipe 4 being connected to easily enter the body 6.

It should be noted that the diameter 19 of this latter component, at the restriction 16, is at least equal to the diameter 12 of the pipe 4 being connected increased by the peripheral rim or flange 20 provided at its free end 3.

The purpose of this peripheral rim or flange 20 is to assist in sealing the connector 1, this sealing effect being basically provided at the base 9 of the body 6. It should be noted that, when the pipe being connected is inserted in the body 6, this peripheral rim or flange 20 co-operates with the wall 21 of a shoulder or a truncated section 22, provided with a large opening angle and connecting the truncated housing 13 to the cylindrical bore 10.

In the case of the sealing device 23 used, more precisely, to seal the connector 1, this is determined in accordance with the nature and pressure of the fluid being conveyed.

Also, this device 23 may consist of a simple seal 24, its properties being selected by a person skilled in the art in accordance with the data obtained, this seal 24 being positioned between the wall of the cylindrical bore 10 and the external circumference 25 of the pipe 4 to be connected, also, in accordance with these conditions, it co-operates with the front face 26 of the peripheral rim or flange 20.

In the situation where the pipe 4 being connected, after assembly is subject to a certain amount of axial play in the body 6, under the effects of high pressures, the situation may result in the ejection of the seal 24 through the truncated section 22. Various solutions may be envisaged in order to remedy this disadvantage. For example, an anti-extrusion ring 27 may be positioned between the seal 24 and the front face 26 of the peripheral ring or flange 20. Therefore, irrespective of the actual play affecting the pipe 4 being connected in the body 6, the seal 24 is held in the cylindrical bore 10 and co-operates with the free end 3 of the said pipe 4 being connected.

Axial immobilization or securing of the seal 24 may also be considered. Depending on circumstances, a slot for receiving the seal 24 may be provided in the external circumference 25 of the pipe 4 being connected 4 or in the wall of the cylindrical bore 10.

A combination of the solutions proposed above may also be considered, the seal 24 being immobilized axially by positioning an anti-extrusion ring 27, between this latter and the front face 26 of the peripheral flange or rim 20.

Finally, a lip seal 28, as represented in FIG. 7, may be used as the sealing device 23.

According to a characteristic of this invention, the male part 5 has clip-in locking devices 29, these comprising retractable stops 30 located between the shoulder 17 provided in the body 6 and the rear face 31 arranged in the direction of the orifice 15 provided in this latter part, together with a peripheral rim or flange 20 located at the free end 3 of the pipe 4 being connected. These rectractable stops 30 are, for example, used to prevent any radial force being exerted on the pipe being connected 4 and tending to release this from the female part 2, this force corresponding to the effects of the pressurized fluid conveyed in the hoses, rigid pipes and the connected items of equipment.

In accordance with a preferential method with construction, these clip-in locking devices 29 or retractable stops 30 comprise at least two members 32 distributed uniformly around the pipe 4 being connected and, at their upper 33 and lower 34 end respectively, co-operating with the shoulder 17 of the body 6 and the rear face 31 of the peripheral rim or flange 20.

As described above, the housing 13 is, preferably, of truncated form. This arrangement considerably reduces the risks of distortion in the members 32 when the compressive forces applied to them are high. However, in the case of the connectors 1 designed to function within a lower range of pressures, this housing 13 may be of strictly cylindrical form.

For preference, the members 32 are connected, at their upper end 33 and/or their lower end 34, by connecting devices 35, these being flexible to permit the engagement and also the withdrawal of the members 32 from the body 6.

The flexible nature of these connecting devices 35 is necessary in order to confer on these members 32 a certain degree of radial mobility, on the one hand, to allow them to pass over the restriction 16 provided at the entry for the body and, on the other hand, to ensure that the upper end 33 co-operates with the shoulder 17.

More precisely, these flexible connecting devices 35 comprise an annular strip 36 which may or may not be split and to which are fixed the upper ends 33 and/or the lower ends 34 of the various members 32.

The drawings illustrate clip-in locking devices 29 which include three members 32 connected together only at their lower end 34 by means of an annular strip 36. This arrangement has the advantage of retaining the members 32, at their lower end 34, in a circle 37 with a diameter slightly less than the orifice defined by the restriction 16 and, therefore, facilitates the engagement of the clip-in locking devices 29 in the body 6.

The choice of an annular strip 36, which may or may not be split, will initially depend on the method of producing this and also on the type of assembly considered for the male part 5 to the pipe 4 being connected. In particular, when the peripheral rim or flange 20 provided at the free end 3 of this latter component is produced before this assembly stage, the operator must be able to fit the male part 5 laterally to the pipe 4 to be connected. Also, the annular strip 36 must be split but it must also be provided with a gap or opening 38 which is basically equal to, or slightly less than, the diameter 12 of the pipe 4 being connected.

As regard the method for producing these clip-in locking devices 29, it is considered that the cutting out and forming of a metal strip constitutes the least expensive solution. A process of this type may be used to provide a U shaped section for the members 32 and these also comprise two parallel sides 39, 40 integral with a web 41, capable of contacting the wall 42 of the housing 13. Also, the annular strip 36 comprises one or more segments 43 connecting the sides 39, 40 of the members 32 at the lower end 34 of these latter components.

In accordance with another characteristic of the invention, these clip-in locking devices 29 include gripping devices 44 which considerably facilitate their engagement or release from the body 6. For preference, these gripping devices 44 comprise tongues 45 at the upper end of 33 of the members 32 and correspond to the extension of the web 41 of these latter items. More precisely, these tongues 45 are initialy formed over the upper edge of the members 32 in order to fit over the shoulder 17 formed by the restriction 16 before emerging from the body 6 through the orifice 15.

Preferably, the width of these tongues 45 will be determined so that, after bending over the upper edge of the members 32, they simultaneously cover the upper edges of the parallel sides 39, 40, in order to prevent these being embedded in the shoulder 17 of the body 6 under the effects of pressure. This would also prevent any dismantling or later re-assembly of the connector 1. For the same reason, the web 41 of the members 32 may be extended at the lower end 34 of these latter then folded over the lower edge of the parallel sides 39, 40, in order that they provide a more extensive bearing area which will co-operate with the peripheral rim or flange 20.

In accordance with the invention, this connector 1 also includes a securing device 46 for the male part 5 in the female part 2. Its ensures that non-radial force may be exerted on the members 32 when the connector is in use and which may result in the accidental release of the free end 3 of the pipe 4 being connected from the female part.

More precisely this securing device 46 comprises, on the one hand, a retaining ring 49 which provides a connection with the clip-in locking device 29 and, on the other hand, a locking ring 48 which acts on these latter components in order to immobilize them in the body 6 comprising the female part 2.

Two methods of construction are illustrated respectively in FIGS. 1 through 4, and 6 and 7, these corresponding to two different types of use for the connector 1.

For example, the retaining ring 49, shown in FIGS. 1 through 4 and corresponding to a first method of construction is capable of co-operating with the gripping device 44 for the clip-in locking device 29. For this reason, this retaining ring 49 includes a central bore 50, its axis being in alignment with the axis of the pipe 4 being connected and in which a shoulder recess 51 is provided, this forming part of the retaining ring 49, on the side of the body 6 and in the direction of the restriction 52. The free ends 53 of the tongues 45 forming the gripping device 44 engage in this shoulder recess 51.

More precisely, the free ends 53 of these tongues 45 are formed so that they spread radially from the axis of the pipe 4 being connected and are inscribed within a circle with a diameter exceeding the restriction 52. These tongues 45 are therefore immobilize in the retaining ring 49.

In accordance with another method of construction, these formed free ends 53 of the tongues 45 may be inserted into recesses 55 provided in the inner wall of the shoulder recess 51. These recesses 55 avoid the need to form a circumferential restriction in the retaining ring 49 as this type of design would be difficult to produce, particularly when it is manufactured from as synthetic material capable of being moulded. A circumferential restriction of this type constitutes a negative clearance which is to be avoided for this type of process.

On the other hand, the recesses 55 may be obtained easily by means of suitable cores provided in the mould and also from the passages 56 in the said retaining ring 49.

In FIGS. 1 and 6 it may be noted that the free ends 53 of the tongues 45 extend not only radially in order, to spread out from the axis of the pipe 4 being connected but are also formed at an angle of 180° in order to form a U shape. This form enables sharp edges to be removed which could normally prevent the engagement of this gripping device 44 in the shoulder recess 51 of the retaining ring 49. However, it should be noted that these free ends 57 of the tongues 45 are in no way limited to this form or shape.

As in the case of the clip-in locking device 29, this retaining ring 49 necessarily, includes a lateral opening 58 suitable for the diameter 12 of the pipe 4 being connected and enables the retaining ring 49 to be fitted over this latter item after forming the peripheral rim or flange 20.

This locking ring 48 includes the securing device 46, this being in the form of a sleeve 59 fitting over the retaining ring 49 and comprises an internal diameter 60 suitable for the external diameter of this latter component. This sleeve 59 also includes an internal sleeve 61 with an external diameter 62 which is slightly less than the diameter of the central bore 50 for the retaining ring 49. Also, the internal diameter 63 of this internal sleeve 61 is suitable for the dimensions of the pipe 4 being connected in order to provide a sliding action.

The internal sleeve 61 forms part of an annular section 64 provided at the end 65 located on the side opposite to the female part 2 of the sleeve 59. Also, it projects relative to the opposite end 66 of this latter item so that it is engaged in the body 6 by entering between the members 32 and the external wall of the pipe 4 being connected.

To summarize, this international sleeve 61 prevents any radial movement of the members 32 and therefore prevents these latter components passing over the restriction 16.

When engaging the clip-in locking devices 29 in the body 6, this locking ring 48 must be maintained partially engaged over the retaining ring 49 in order that the radial movement of the members 32 is not prevented. In this position, the free ends 53 of tongues 45 are located in recess 55 and hold the retaining ring 49 in position. However, it should be noted that, on the other hand, if the male part 5 does not fit into the female part 2, this difficulty may be easily identified by means of suitable sensors when assembling these connectors 1 using automated robot machines.

This locking ring 49 has a dual function. On the one hand, it immobilizes the clip-in locking device 29 in the body 6 and, on the other hand, prevents any lateral movement of the male part 5, this comprising the clip-in locking device 29 and the securing device 46 for the pipe 4 being connected.

The sleeve 59 also includes a means 68 for pivoting on the retaining ring 49 in order to offset their respective openings 58, 67. This means of pivoting 68 comprises, on the one hand, semi circular slots 69 provided in the external circumference of the retaining ring 49 and, on the other hand, projections 70 on the inner wall of the sleeve 59, capable of sliding in the semi-circular slots 69. For preference, these latter terminate, at their ends, in recesses 71, 72, in which the projections 70 are introduced when the sleeve completes its rotational movement over the retaining ring 49.

From the offset position of the openings 58, 67, relative to each other, it must be possible to provide the locking ring 48 with an axial displacement in order to ensure that the inner sleeve 61 is engaged in the body 6. Also slots 73 formed in accordance with generatrices over the external circumference of the retaining ring 49 emerge in the recesses 72, in which the projections 70 engage following an angular displacement of the openings 58, 67. This enables the projections 70 to move along these slots 73 under the action of sufficient force exerted on the locking ring 48.

As in the preceding case, the position, when secured, may be identified by means of a recess 74 terminating at the lower end of the slots 73 and designed to receive the projections 70.

In accordance with another method of construction, represented in FIG. 2, an opening 75 may be formed in the wall of the sleeve 59, this opening 75 being used to locate; in the secured position, a locking lug 76 which is integral with the external wall of the retaining ring 49. More precisely, this locking device 76 will be positioned, for preference, opposite a passage 56 formed in the retaining ring 49 so that it is possible, as a result of its flexibility, to suppress any movement of the sleeve 59.

Obviously, the lateral openings 58 and 67 provided, respectively, in the retaining ring 49 and in the sleeve 59 are only necessary if the connector 1 is associated with the pipe 4 to be connected after forming the cylindrical rib or flange 20. In the case of this solution, the means of rotation 68 has no purpose, only the axial displacement of the locking ring 48 on the retaining ring 49 must be possible.

FIGS. 6 and 7 represent another method of producing the corresponding securing device 46 when the connector 1 is finally associated with the pipe 4 being connected. This securing device 46 has, however, a configuration which is basically identical to that described above as it comprises a retaining ring 149 which is designed to co-operate with the gripping device 44 for the clip-in locking device 29 and a locking ring 148.

The retaining ring 149 includes a central bore 150 which has a shoulder recess 151 emerging on the side of the male part 5 through the restriction 152. The effect is that the free ends 53 of the tongues 45 corresponding to the gripping device 44 are retained in the said shoulder recess 151. It should be noted that these free ends 53 of the tongues 45 may posess a configuration which is identical to that described above. Also, as in the preceding case, the restrictions 152 result from the presence of the recesses 155 provided in the shoulder recess 151.

If the retaining ring 149 is produced by means of a moulding process, these recesses 155 may be produced by arranging, radially, a certain number of cores in the mould, these cores forming the openings 156 on the external circumference of the retaining ring 149.

The locking ring 148 is in the form of a sleeve 161, its external dimensions 162 being suitable for the bore 150 in the retaining ring 149, in order to permit its engagement in this latter item. This sleeve 161 also has an internal diameter 163 which depends on the cross action of the pipe being connected 4. For example, it may be positioned between the external circumference of the pipe 4 being connected and the members 32 of the clip-in locking device 29 and therefore preventing this from being released from the body 6. A flange 164 forming part of the upper end 165 of the said sleeve 161 limits the engagement of this latter component in the female part 2 by contacting the upper face 166 of the retaining ring 149. Preferably, in accordance with the second method of construction, the securing device 46 is produced by a moulding process and in one piece. This is shown in FIG. 6 where the locking ring 148 and, in particular, the sleeve 161 is rendered integral, at several points and at its lower end 167, with the upper edge 168 of the central bore 150 formed in the retaining ring 149.

Therefore, when connecting the male part 5 to the female part 2 and, more precisely, after engaging the clip-in locking device 29 in the body 6, the various points connecting the sleeve 161 to the retaining ring 149 are designed to flex under the action of a thrust exerted on the latter component.

However, as the retaining ring 149 enters the said central bore 150, the sleeve 161 encounters the locking lugs 169 which, being flexible, also flex. These then slide in the slots 170 formed in the outer circumference 171 of the said sleeve 161 and arranged along the generatrices. On the other hand, when the male part 5 is disconnected relative to the female part 2, these locking lugs 160 form stops by contacting the lower stops 172 for the slots 170, in this way, the locking ring 148 remains in contact with the retaining ring 149 in accordance with a first assembly of the connector 1.

As described above releasing the clip-in locking device 29 from the body 6 can only be achieved after contracting the members 32 relative to the external circumference of the pipe 4 being connected in order that the restriction 16 may be passed over.

In order to avoid any long and difficult manipulation of the clip-in locking device 29 during the disconnection operation, the retaining ring 49, 149 may, for preference, include a device 173 which may contact the said members 32 relative to the external circumference of the pipe 4 being connected, by a simple tractive force or pull on the securing device 46 and, in particular, the retaining ring 49, 149. For preference, this device 173 comprises a truncated section 174 which connects the shoulder recess 51, 151, formed in the said retaining ring 49, 149 to the restrictions 52, 152.

Therefore, by exerting a tractive force on the said retaining ring 49, 149, the free ends of the tongues 45 comprising the gripping device 44 pass over the truncated section 174 and contract onto the pipe 4 being connected, this similar affecting the members 32.

On reading the above, it may be noted that the hose or the rigid pipe connected using the connector 1, in accordance with the invention, to any item of equipement may be easily positioned at an angle relative to this latter, that is, before the hydraulic circuit is pressurized. This characteristic may be considered an advantage, in particular, when the assembly is carried out under difficult conditions where a minimum of space is available. However, in other situations, it may be necessary to position the hose or the rigid pipe at a particular angle when being assembled, relative to the hydraulic equipment concerned.

Therefore, in accordance with the invention, the connector 1 may include a means of providing angular identification 175 for the pipe 4 being connected into the body 6. This identifying device 175 consists of providing, on the periphery at the free end 3 of the pipe 4 being connected, away from the sealing device 23, projections or shaped sections 176 which may be introduced into splines 177 formed in the cylindrical bore 10 located at the base 9 of the body 6.

To summarize, this identifying device 175 enables the pipe 4 being connected to be immobilized in rotation relative to the female part of the connector 1. This provides a choice of orientation and this therefore applies to the item of equipment to which the pipe is being connected.

In accordance with the invention as described in the preceding text, it may be noted that the connector 1 has considerable advantages relative to the types of connectors used previously for hydraulic circuits, particularly when these are subjected to high pressures. Also, because of the several different construction methods possible and described above, it is possible to satisfy all the conditions imposed by the immediate environment. It should be noted that, although the invention is described as comprising a part moulded from a synthetic material, the securing device 46 may be produced by other processes and, more particularly, from different materials in order to withstand, in particular, high operating temperatures when the thermoplastic materials most frequently used cannot withstand the temperatures.

I claim:

1. A connector for an end of a conduit, said conduit having an external diameter, said conduit adapted for use in a hydraulic circuit, said connector comprising:
   a female part for receiving a free end of said conduit, said female part comprising:
      a body having a base;
      a cylindrical bore extending through said base, said bore having a diameter at least equal to said conduit external diameter;
      a tapered housing and a restriction in said body defining a shoulder within said body; and
   a male part for insertion into said female part, said male part comprising:
      a clip-in locking device comprising at least two radially retractable members for being uniformly distributed around said conduit, each of said retractable members having an upper end and a lower end adapted to be positioned between said shoulder of said body of said female part and a peripheral rim formed on said conduit, and an upper extension extending above each of said upper ends;
      a securing device for cooperation with said upper extensions of said upper ends of said retractable members for preventing said upper extensions from moving radially outwardly and for preventing said retractable members from moving longitudinally past said shoulder.

2. A connector according to claim 1, wherein said tapered housing is in the form of a truncated cone.

3. A connector according to claim 1, wherein said at least two radially retractable members are U-Shaped.

4. A connector according to claim 3, wherein said at least two radially retractable U-Shaped members are formed as a web.

5. A connector according to claim 1, wherein said at least two radially retractable members may contact a wall of said tapered housing.

6. A connector according to claim 1, wherein said at least two radially retractable members are connected at said lower end, by a flexible connecting device.

7. A connector according to claim 6, wherein said flexible connecting device comprises an annular strip which is split.

8. A connector according to claim 1, wherein said clip-in locking device comprises a flat metal strip, cut and formed into said at least two radially retractable members, rendered integral by at least one annular strip.

9. A connector according to claim 8, wherein said at least one annular strip comprises at least one segment connecting said at least two radially retractable members, said at least one segment further comprising two parallel sides and upper and lower ends adapted to co-operate with said at least one segment.

10. A connector according to claim 9, wherein said securing device comprises tongues formed by an extension of said at least two radially retractable members, said tongues being formed over said upper end of said at least two radially retractable members thereby covering said upper ends of said two parallel sides.

11. A connector according to claim 10, wherein said at least two radially retractable members extend and are formed over said lower end of said two parallel sides, thereby providing an extensive bearing area adapted to be in contact with said peripheral rim of said conduit.

12. A connector according to claim 11, wherein said securing device further comprises a retaining ring adapted to be in connection with said securing device, and a locking ring adapted to immobilize said clip-in locking device in said body. to immobilize said clip-in locking device in said body.

13. A connector according to claim 12, wherein said retaining ring comprises a central bore having an axis in line with an axis of said conduit, a shoulder recess opening in a direction from said retaining ring toward said body through a restriction in said shoulder recess, said shoulder recess adapted to engage with free ends of said tongues which spread radially from said axis of said conduit, said free ends being described within a circle having a diameter exceeding a diameter of said restriction in said shoulder recess when said connector is in an unsecured position, said shoulder recess having a wall with recesses adapted to receive said free ends when said connector is in a secured position.

14. A connector according to claim 13, wherein said locking ring comprises a sleeve adapted to be engaged over said retaining ring, said locking ring further comprising an internal sleeve having an external diameter slightly less than a diameter of said central bore of said retaining ring, and an internal cross section adapted to dimensions of said conduit, said internal sleeve further provided with a projection adapted to be engaged in said body between said conduit and said at least two radially retractable members preventing said at least two radially retractable members from passing over said restriction in said body.

15. A connector according to claim 14, wherein said sleeve is provided with an opening in an outer wall which is adapted to locate, in said secured position, a locking lug on said retaining ring.

16. A connector according to 14, wherein said female part, said clip-in locking device, said retaining ring, and said locking ring are further provided with lateral openings, said lateral openings having dimensions corresponding to dimensions of said conduit, said lateral openings adapted so as to allow said female part, said clip-in locking device, and said securing device to fit laterally over said conduit when said peripheral rim or flange is formed on said pipe before assembling said male part of said connector.

17. A connector according to claim 16, wherein said sleeve and said retaining ring are further provided with means for rotating, angularly offset said lateral openings of said locking ring and said retaining ring, said means for rotating adapted to prevent release of said male part relative to said conduit.

18. A connector according to claim 17, wherein said means for rotating comprises semi-circular slots provided in an external circumference of said retaining ring and projections on an inner wall of said sleeve adapted to slide in said semi-circular slots.

19. A connector according to claim 18, wherein said semi-circular slots terminate at respective ends in recesses adapted to engage said projections upon completion of rotational movement of said rotating means, further wherein said external circumference of said retaining ring is provided with a slot along generatrices adapted to permit axial displacement of said locking ring and engagement of said internal sleeve in said body.

20. A connector according to claim 12, wherein said locking ring comprises a sleeve adapted to slide in a central bore of a retaining ring having an internal diameter suitable for the dimensions of said conduit, said sleeve comprising a flange integral with an upper end of said sleeve and adapted to co-operate, in a secured position, with an upper face of said retaining ring limiting engagement of said sleeve in said body, said retaining ring further provided with locking lugs which project into said central bore and adapted to slide in slots provided on an outer circumference of said sleeve.

21. A connector according to claim 13, wherein said retaining ring is provided with means for tightening said at least two radially retractable members onto said conduit comprising a tapered section between said shoulder recess and said restriction in said shoulder recess, said tapered section adapted to allow said free ends to radially move when a tractive force is applied to said retaining ring allowing release of said clip-in locking device from said body.

22. A connector according to claim 1, comprising a means of angular identification for said conduit in said body, said means for angular identification further comprising formed sections provided at said free end of said conduit beyond a sealing device and splines formed in said cylindrical bore of said body at said base.

23. A connector according to claim 6, wherein said flexible connecting device comprises an annular strip which is continuous.

* * * * *